(12) United States Patent
Sugaya et al.

(10) Patent No.: US 7,404,790 B2
(45) Date of Patent: Jul. 29, 2008

(54) AIRBAG FOLDING METHOD AND FOLDING DEVICE

(75) Inventors: Mitsuru Sugaya, Aichi-ken (JP);
Yoshitaka Kashitani, Aichi-ken (JP);
Katsuhiko Kato, Aichi-ken (JP);
Takashi Fujimoto, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 123 days.

(21) Appl. No.: 11/339,794

(22) Filed: Jan. 26, 2006

(65) Prior Publication Data

US 2006/0172874 A1 Aug. 3, 2006

(30) Foreign Application Priority Data

Jan. 28, 2005 (JP) .............................. 2005-022136

(51) Int. Cl.
*B31B 1/26* (2006.01)
(52) U.S. Cl. ....................... 493/458; 493/454; 493/457; 53/116; 53/429; 280/743.1

(58) Field of Classification Search ........... 53/116–120, 53/429, 430; 493/243, 244, 405, 409, 457–459, 493/454; 280/728.1, 730.1, 743.1
See application file for complete search history.

(56) References Cited

U.S. PATENT DOCUMENTS

| 5,493,846 | A | * | 2/1996 | Baker et al. ................... 53/429 |
| 5,694,737 | A | * | 12/1997 | Lunt et al. .................... 53/119 |
| 5,746,690 | A | * | 5/1998 | Humbarger et al. ......... 493/405 |
| 7,261,682 | B2 | * | 8/2007 | Crookston et al. .......... 493/457 |
| 2007/0075532 | A1 | * | 4/2007 | Yokoyama et al. ....... 280/730.2 |

FOREIGN PATENT DOCUMENTS

JP        A-7-186865        7/1995

* cited by examiner

*Primary Examiner*—Thanh K. Truong
(74) *Attorney, Agent, or Firm*—Posz Law Group, PLC

(57) ABSTRACT

In an airbag folding method, an airbag is folded so as to provide a rolled-up shape thereon using a core member including air suction holes from which air can be sucked in. Firstly, the core member is disposed on part of the spread airbag that is to be rolled up at a location which corresponds to a center of a rolled-up shape when formed, and following this, the core member is rotated so as to wind up the airbag around the core member to thereby form a spiral shape while air is being sucked in from the air suction holes so that the airbag is drawn to be secured to an outer circumferential surface of the core member. Thereafter, a rolled-up shape is formed on the airbag by removing the core member.

1 Claim, 13 Drawing Sheets

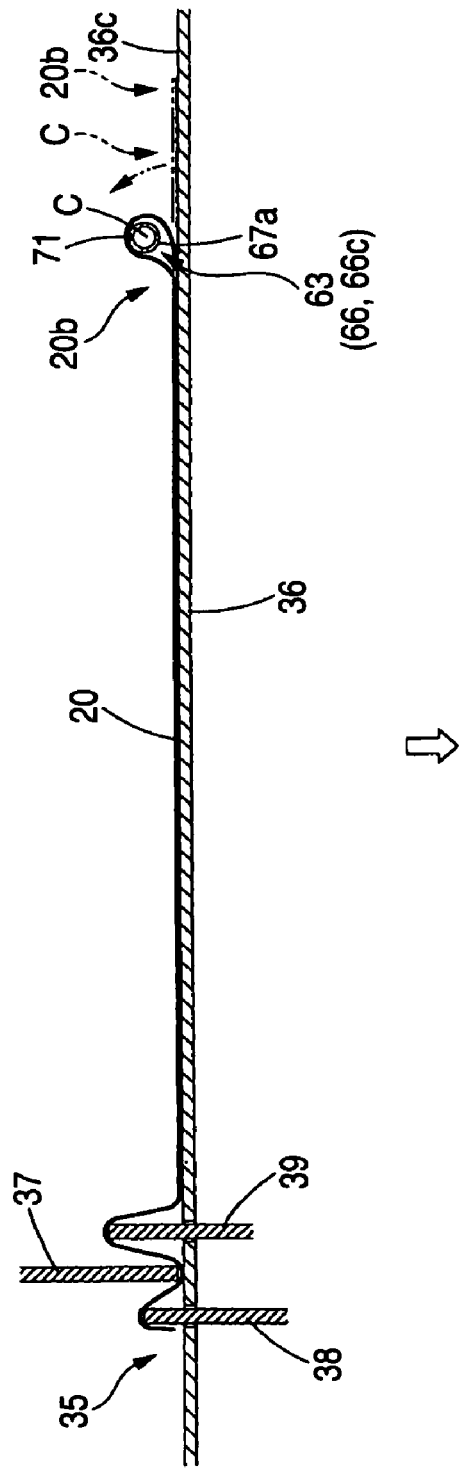
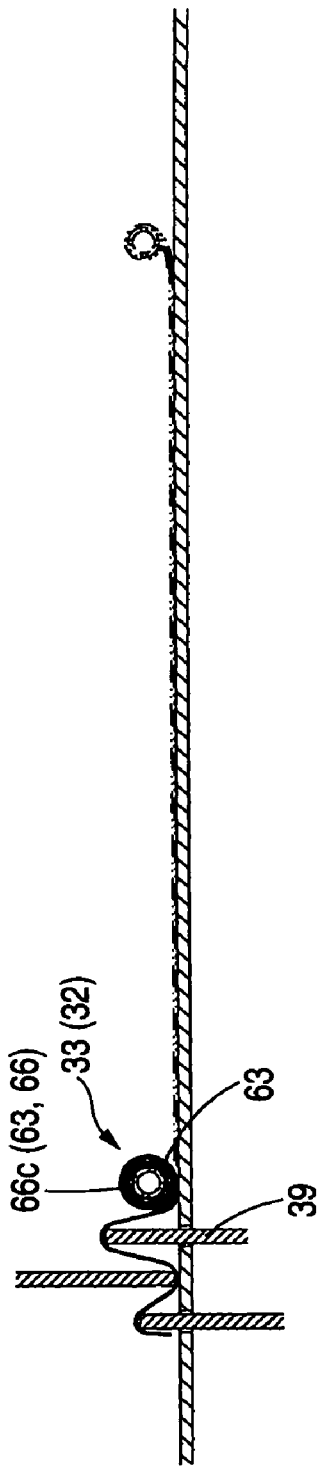
FIG. 12A
FIG. 12B

AIRBAG FOLDING METHOD AND FOLDING DEVICE

BACKGROUND OF THE INVENTION

1. Field of the Invention

The present invention relates to a method of folding an airbag so as to form the airbag in a rolled-up shape and a folding device that is to be used in the method. An airbag is folded and installed in a vehicle and is deployed while unfolding folds by introducing an inflation gas thereinto so as to be inflated and disposed at a predetermined place to thereby protect occupants or pedestrians.

2. Related Art

Conventionally, in a head protecting airbag device, for example, when it is to be installed in a vehicle, the airbag is folded and housed on an upper edge side of windows, and as this occurs, there exists a case where a rolled-up shape in which the airbag is spirally folded is provided in order to be housed (refer, for example, to JP-A-2004-58848).

Then, when the air bag is formed in such a rolled-up shape, there has been used, for example, a folding method which uses two folding rods (refer, for example, to JP-A-7-186865). In this folding method, a part of the airbag is held with the two folding rods, and then, the two folding rods are rotated while they hold the airbag therebetween, so that the airbag is wound around the two folding rods in a spiral manner. Thereafter, the two folding rods are pulled out of the airbag so wound up to leave a rolled-up shape on the airbag.

In the conventional folding method, however, the airbag may slide off between the two folding rods when the folding rods are rotated. Since, in case this actually occurs, the intended roll folding becomes impossible, the folding needs to be carried out while a strong holding force is being applied thereto.

However, in a case where the two folding rods are rotated with such a strong holding force applied thereto so as to produce a spirally wound airbag part therearound to thereby form a rolled-up shape, the two folding rods needs to be separated apart from each other when they are pulled out of the folded airbag. However, the spirally folded airbag itself may becomes a restriction to the required movement by sticking around the rods, and as this actually occurs, it becomes difficult to pull out the two folding rods from the airbag. In particular, when attempting to make a compact rolled-up shape, this type of problem tends to be caused.

SUMMARY OF THE INVENTION

The invention was made with a view to solving the problem and an object thereof is to provide an airbag folding method and folding device which can enable an appropriate formation of a rolled-up shape of airbag and facilitate a compact folding thereof.

According to the invention, there is provided a method of folding an airbag, comprising the steps of:

disposing a core member having an air suction hole thereon on a part of a spread airbag to be rolled up corresponding to a center of a rolled-up shape of the airbag;

rotating the core member while sucking air from the air suction hole of the core member so that the airbag is sucked on an outer circumferential surface of the core member and wound around the core member; and removing the core member to thereby leave the airbag in the rolled-up shape.

In the airbag folding method according to the invention, the core member, which draws thereto the airbag by sucking in air so that the airbag is secured therearound, is disposed at the location on the airbag which corresponds to the center of spiral winding of the airbag, and then, the core member is rotated so as to form on the airbag the rolled-up shape where the airbag is wound in the spiral manner. Then, since the airbag itself has such an extent of impermeability that air is not allowed to pass therethrough, so as to be inflated when an inflation gas is introduced thereinto, the airbag can be wound around the core member smoothly without being dislocated therefrom, whereby the rolled-up shape can appropriately be formed on the airbag.

In particular, in the folding method of the invention, since the airbag is wound around the outer circumferential surface of the single core member to form the rolled-up shape, a hollow space produced at the center of the rolled-up shape of the airbag is of a size which coincides substantially with an outside diameter of the core member, and hence, an inside diameter dimension of the hollow space at the center of the rolled-up shape can be made as small as possible compared with the conventional folding method in which the two folding rods are disposed at the center of the rolled-up shape, or the area of the airbag where the airbag is rolled up in the spiral manner can be made as large as possible, thereby making it possible to easily secure a stable and compact spirally folded shape when the designed folding is completed.

In addition, in the folding method of the invention, when attempting to remove the core member after the airbag has been wound therearound, in the event that the suction of air is stopped, a gap is easily generated between an inner circumferential surface of the airbag which is wound up in the spiral manner and the outer circumferential surface of the core member, and therefore, even when the airbag is strongly wound around the core member with a view to attaining a further compact folding, the core member can smoothly be removed of the airbag so wound up.

Consequently, in the airbag folding method according to the invention, the rolled-up shape can appropriately be formed, and the airbag can easily be folded compact.

Additionally, when removing the core member, in the event that air is made to be discharged from the air suction hole, a gap is easily generated between the inner circumferential surface of the airbag which is wound up in the spiral manner and the outer circumferential surface of the core member, and therefore, even when the airbag is strongly wound around the core member with a view to attaining a further compact folding, the core member can smoothly be removed of the airbag so wound up.

According to the invention, there is provided a folding device for forming an airbag in a rolled-up shape, comprising:

a table on which a spread airbag is placed;

a core member having an air suction hole through which air is sucked for holding the airbag around an outer circumferential surface thereof;

an air suction source connected to the core member so as to suck air through the air suction hole; and a rotary mechanism which supports and rotates the core member such that the airbag placed on the table is wound around the core member.

In the folding device according to the invention, the airbag is spread on the table, the core member is disposed on the airbag near the location which corresponds to the center of a rolled-up shape to be formed, and the core member so disposed is rotated while the air suction source is actuated and air is sucked from the air suction hole. Then, the airbag is wound around the core member while being sucked to be secured to the air suction hole, whereby a spirally shaped part is formed around the core member. Thereafter, in the event the operation of the air suction source is stopped, the sucking and securing of the airbag to the core member is stopped so as to ease the dislocation of the airbag from the outer circumferential surface of the core member, and when removing the core member from the airbag, it is possible to obtain the airbag having the rolled-up shape formed thereon.

By the above feature, with the folding device of the invention, the aforesaid airbag folding method can be implemented smoothly.

Additionally, in the folding device of the invention, an air discharge source may be provided which is connected to the core member so as to enable the discharge of air from the air suction hole, and in this case, when removing the core member, in the event that the air discharge source is actuated so as to enable the discharge of air from the air suction hole, a gap is easily generated between the inner circumferential surface of the airbag which is wound up in the spiral manner and the outer circumferential surface of the core member, and therefore, even when the airbag is strongly wound around the core member with a view to attaining a further compact folding, the core member can smoothly be removed of the airbag so wound up.

BRIEF DESCRIPTION OF THE DRAWINGS

FIGS. 12A and 12B are explanatory views which explain sequentially processes of the folding method of the embodiment which follow the processes shown in FIGS. 11A through 11C;

DETAILED DESCRIPTION OF THE PREFERRED EMBODIMENTS

Figure 1:
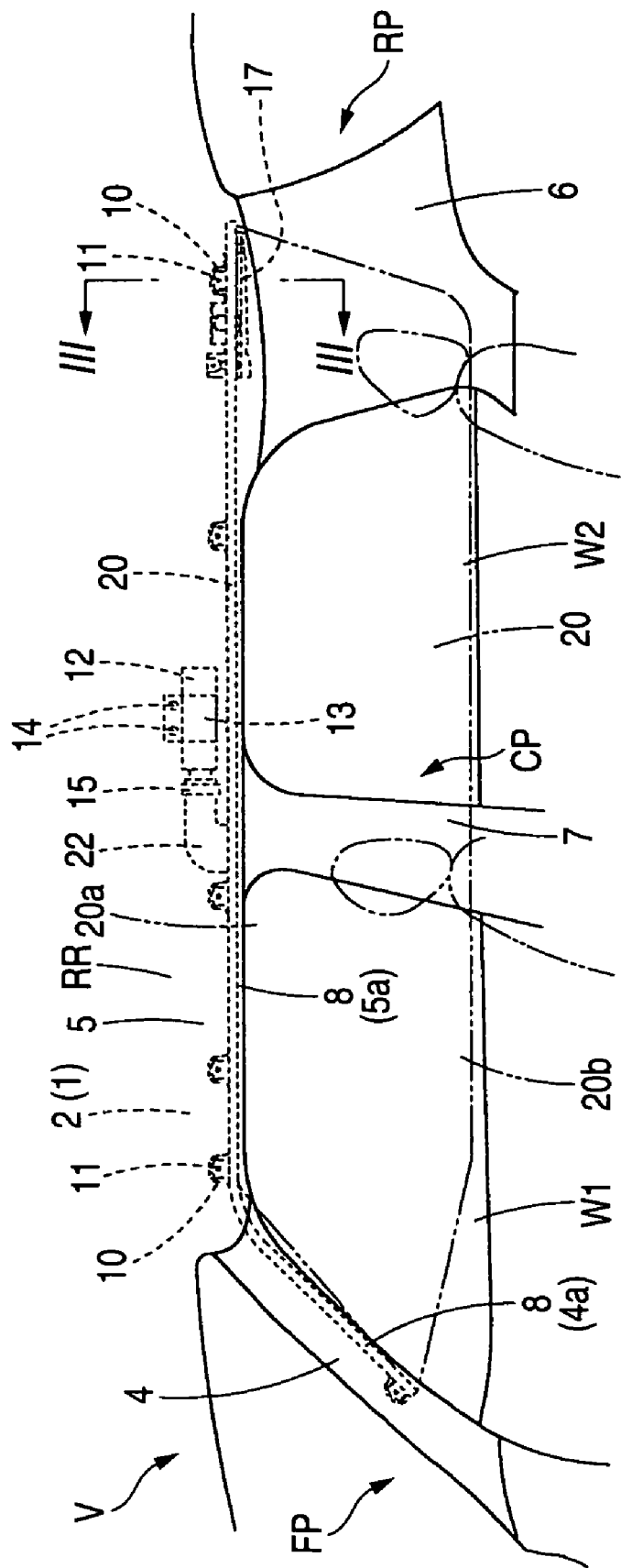
FIG. 1 is a schematic front view which shows a state in which a head protecting airbag apparatus is installed on a vehicle in which an airbag folded up according to an embodiment of the invention is used.
Figure 2:
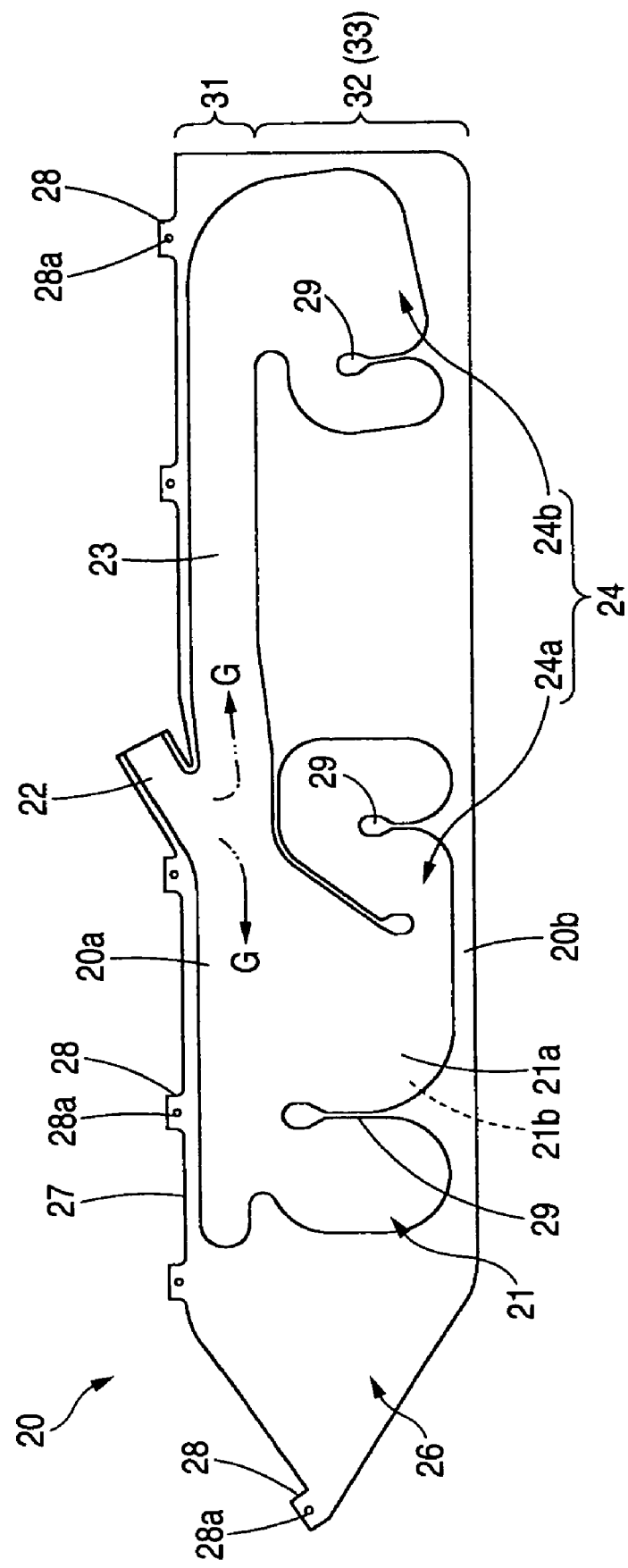
FIG. 2 is a development showing the airbag according to the invention that is spread flat.

Hereinafter, an embodiment of the invention will be described based on the drawings. As shown in FIGS. 1 and 2, an airbag which is to be folded in the embodiment is a head protecting airbag 20 according to a head protecting airbag apparatus M, and the head protecting airbag apparatus M includes the airbag 20, an inflator 12, mounting brackets 10, 13, an guide bracket 17, and an airbag cover 8. Then, the airbag 20 is folded up and housed on an upper edge side of side windows W1, W2 within a range extending from a lower edge side of a front pillar portion FP to an upper side of a rear pillar portion RP via a lower edge side of a roof side rail portion RR.

The inflator 12 is, as shown in FIG. 1, of a cylinder type and is actually formed substantially into a cylinder shape, and a connecting port portion 22 of the airbag 20 from which an inflation gas is introduced into the airbag 20 is fitted on the inflator 12, whereby the inflator 12 is connected to the airbag 20 utilizing a clamp 15. Then, the inflator 12 is fixedly mounted on an inner panel 2 at the roof side rail portion RR near a position above a center pillar portion CP while being covered by a lower edge 5a of a roof lining 5. Note that the inner panel 2 is a member on the side of a body of a vehicle V. In addition, the mounting bracket 13 is made of a sheet metal, holds the inflator 12 and is fixed to the inner panel 2 by making use of bolts 14.

Each mounting bracket 10 is provided with two plates each made of a sheet metal (refer to FIG. 3) and is mounted on each mounting portion 28 so as to hold the mounting portion 28 therebetween, and the mounting portion 28 is then fixedly mounted on the inner panel 2 with a mounting bolt 11. Note that each mounting bolt 11 is fastened in a mounting hole 2a formed in the inner panel 2 where a nut 2b is provided.

The airbag cover 8 is provided with lower edges 4a, 5a of a pillar garnish 4 disposed on the front pillar portion FP and the roof lining 5 disposed on the roof side rail portion RR. Note that the front pillar garnish 4 and the roof lining 5 are made of a synthetic resin and are fixedly mounted on a passenger compartment side of the inner panel 2 of the body 1, respectively. In addition, the roof lining 5 is provided to extend from a position near above the front pillar portion FP to a position near above the rear pillar portion RP via above the center pillar portion CP.

Figure 3:
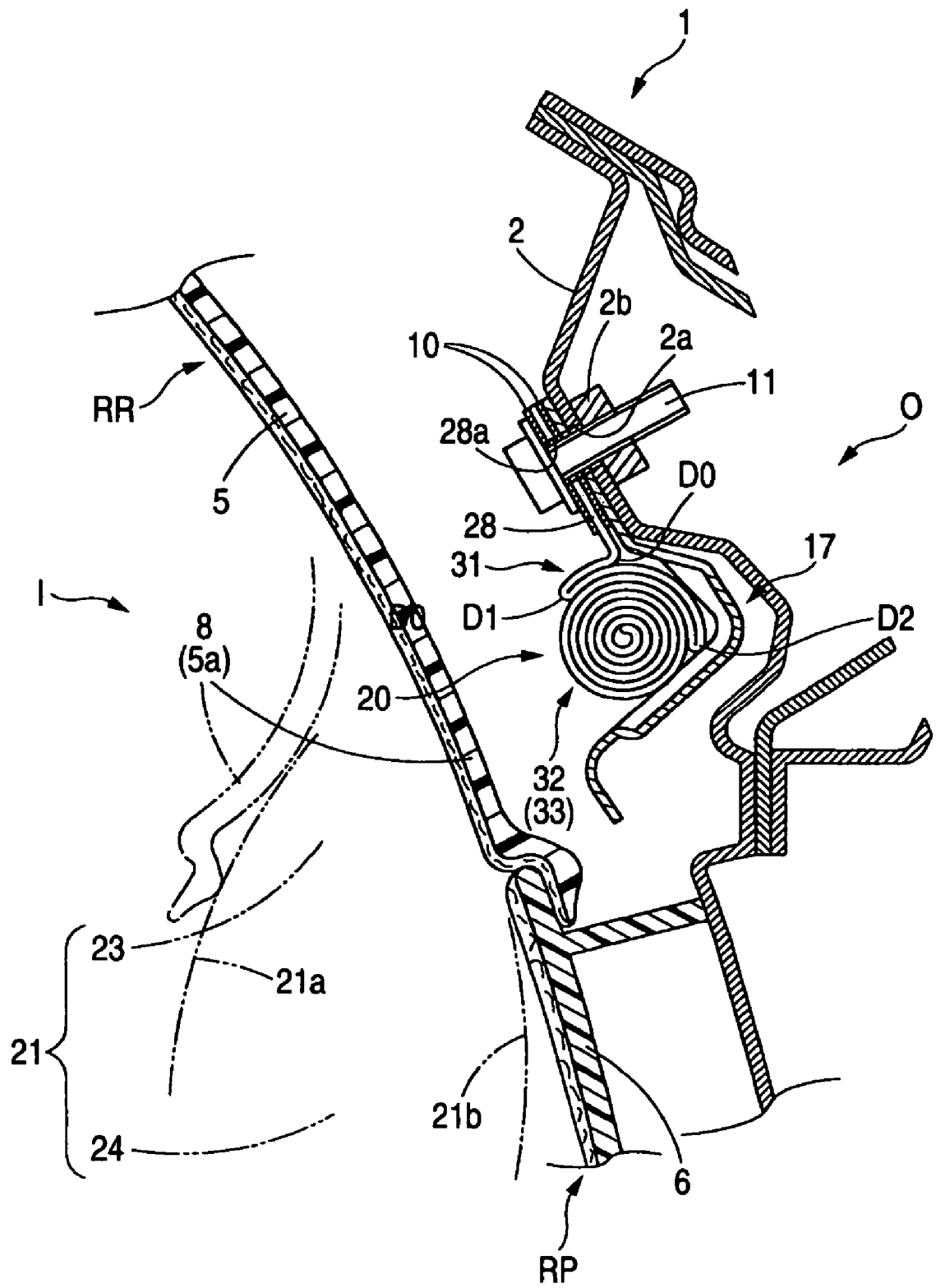
FIG. 3 is a sectional view showing the state in which the airbag apparatus according to the embodiment is installed on the vehicle, which corresponds to a sectional view of a location taken along the line III-III in FIG. 1.

The guide bracket 17 is, as shown in FIGS. 1 and 3, disposed above the rear pillar portion RP, is made of a sheet metal which is formed into a shape having a substantially L-shaped or U-shaped cross section and is provided to make the airbag 20 project to a passenger compartment side I, when inflated, without interfering with a pillar garnish 6.

The airbag 20 is, as shown in FIGS. 1 to 4C, produced by virtue of hollow or tubular weaving which uses polyamide threads and is inflated to be spread from a folded state so as to cover the passenger compartment side I of the side windows W1, W2 and pillar garnishes 7, 6 of the center pillar portion CP and the rear pillar portion RP, when an inflation gas G is allowed to flow thereinto from the inflator 12. In addition, the airbag 20 is provided with a gas-flow permitted portion 21 which inflates so as to allow an internal wall portion 21a and an external wall portion 21b thereof to be separated apart from each other by the inflation gas G allowed to flow thereinto and a gas-flow prohibited portion 26 which prohibits the flow of the inflation gas G.

The gas-flow prohibited portion 26 is formed in such a way that the wall portions 21a, 21b of the gas-flow permitted portion 21 are joined to each other and is provided with a circumferential edge portion 27, mounting portions 28 and partitioning portions 29. The circumferential edge portion 27 is disposed along an outer circumferential edge portion of the airbag 20 and is formed so as to surround a circumference of the gas-flow permitted portion 21.

The mounting portions 28, which are provided in a plural number (six in this embodiment), are formed so as to project upwards from the circumferential edge portion 27 on the side of an upper edge 20a of the airbag 20. A mounting hole 28a is formed in each mounting portion 28 which allows the passage of the bolt 11. Then, as has been described before, each mounting portion 28 is secured to the mounting bracket 10 which is to be mounted on the inner panel 2 and the bolt 11 is passed through each mounting hole 28a to be screwed into the nut 2b, whereby the mounting portion 28 is fixed to the inner panel 2 (refer to FIG. 3).

The partitioning portions 29 are disposed within an area of a primary protecting inflating portion 24 so as to invade thereinto from the circumferential edge portion 27 and is provided so as to regulate the thickness of the primary protecting inflating portion 24 so as to allow the primary protecting inflating portion 24 to be inflated into a plate-like shape.

In the case of this embodiment, the gas-flow permitted portion 21 is provided with the connecting port portion 22, a gas supply path portion 23 and the primary protecting inflating portion 24. The gas supply path portion 23 is provided to extend rectilinearly along a longitudinal direction of the vehicle V on the side of the upper edge 20a of the airbag 20. The connecting port portion 22 is formed at substantially a middle location along the longitudinal direction of the gas supply path portion 23 so as to extend upwardly so as to allow the passage of the inflation gas G from the inflator 12 to the interior of the gas-flow permitted portion 21. The gas supply path portion 23 allows the inflation gas G from the connecting port portion 22 to flow in both longitudinal directions of the vehicle V and is to constitute an upstream-side part of the airbag 20 which first inflates. Note that the gas supply path portion (the upstream-side part) 23 is partially covered by the airbag cover 8 on the side of an upper portion thereof and on the side of a lower potion thereof extends to be disposed as downwards as near upper portions of the occupants' heads when the gas supply path portion 23 has completed its inflation while installed on the vehicle.

The primary protecting inflating portion 24 is an area adapted to protect the heads of the occupants seated in seats of the vehicle V together with the lower portion of the gas supply path portion 23, and a front portion 24a thereof is disposed below a front side of the gas supply path portion 23 and is made to inflate downwards to be disposed to the side of a front seat of the vehicle so as to cover the side window W1 by the side of the front seat, when the airbag 20 is inflated to be deployed, whereas a rear portion 24b thereof is disposed below a rear side of the gas supply path portion 23 and is made to inflate downwards to be disposed to the side of a rear seat of the vehicle V so as to cover the side window W2 by the rear seat, when the airbag 20 is inflated to be deployed.

Figure 4A:
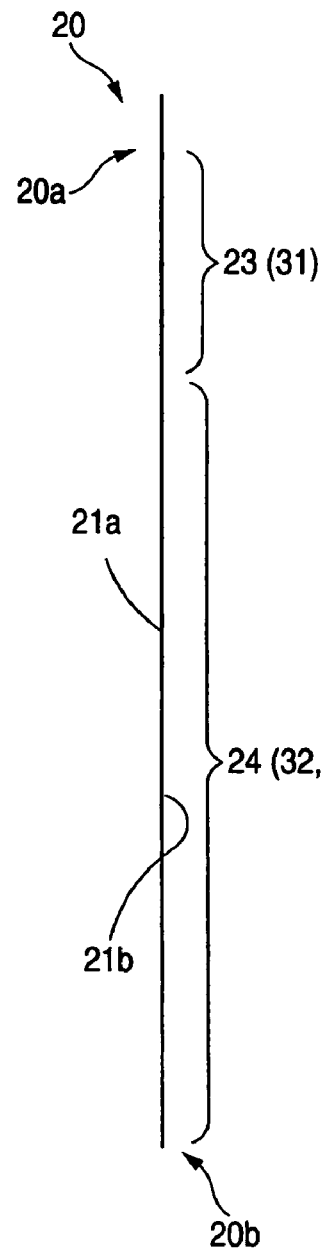
FIGS. 4A through 4C are explanatory views which briefly explain a folding process of the airbag according to the embodiment.
Figure 4B:
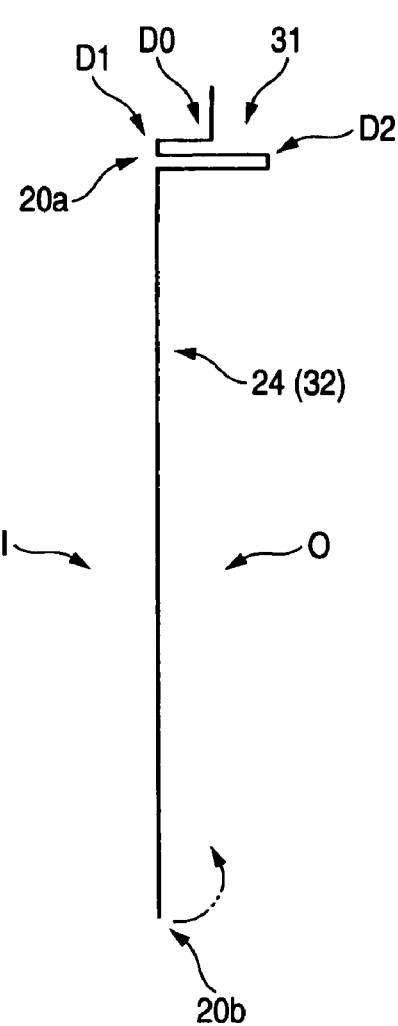
Figure 4C:
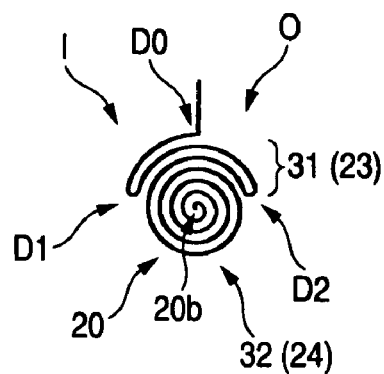

A folding method of the airbag 20 will be briefly described. Firstly, the internal wall portion 21a and the external wall portion 21b are spread flat so as to be superposed on each other, and the upstream-side part (the gas supply path portion) 23 on the side of the upper edge 20a of the airbag 20 is folded on to itself in a vertical direction in a bellows-like fashion while producing folds D0, D1, D2 (refer to FIGS. 4A and 4B) sequentially so as to form a bellows part 31. Furthermore, as shown in FIG. 4C, on the side of a lower portion of the airbag 20 which lies below the bellows part 31 of the airbag 20, a lower edge 20b of the airbag 20 is rolled up so as to wind it towards the outside O of the vehicle so as to form a rolled-up shape 32, whereby the folding work of the airbag 20 can be completed, and after the completion of the folding of the airbag 20, a wrapping material, which is breakable and is not shown, is wound around the airbag 20 so folded up to prevent the collapse of the folds.

In the airbag 20 that is folded up as has been described heretofore, when the inflation gas G is supplied from the inflator 12 thereinto after the installation on to the vehicle V, the inflation gas G is allowed to flow from the connecting port portion 22 to the primary protecting inflating portion 24 via the gas supply path portion 23, whereby as the inflation gas G flows into the gas supply path portion 23 at the bellows part 31, the rolled-up shape 32 is pushed out into the passenger compartment side I in association with unfolding the folds of the bellows part 32. Then, even in the event that the airbag 20 interferes with the occupants while the folds of the rolled-up shape 32 are unfolded, the folds still continue to be unfolded while interfering with the occupants, whereby even with only a narrow gap provided between the occupants and the windows W1, W2, the airbag 20 is allowed to inflate and deploy so as to protect the occupants' heads.

Figure 5:
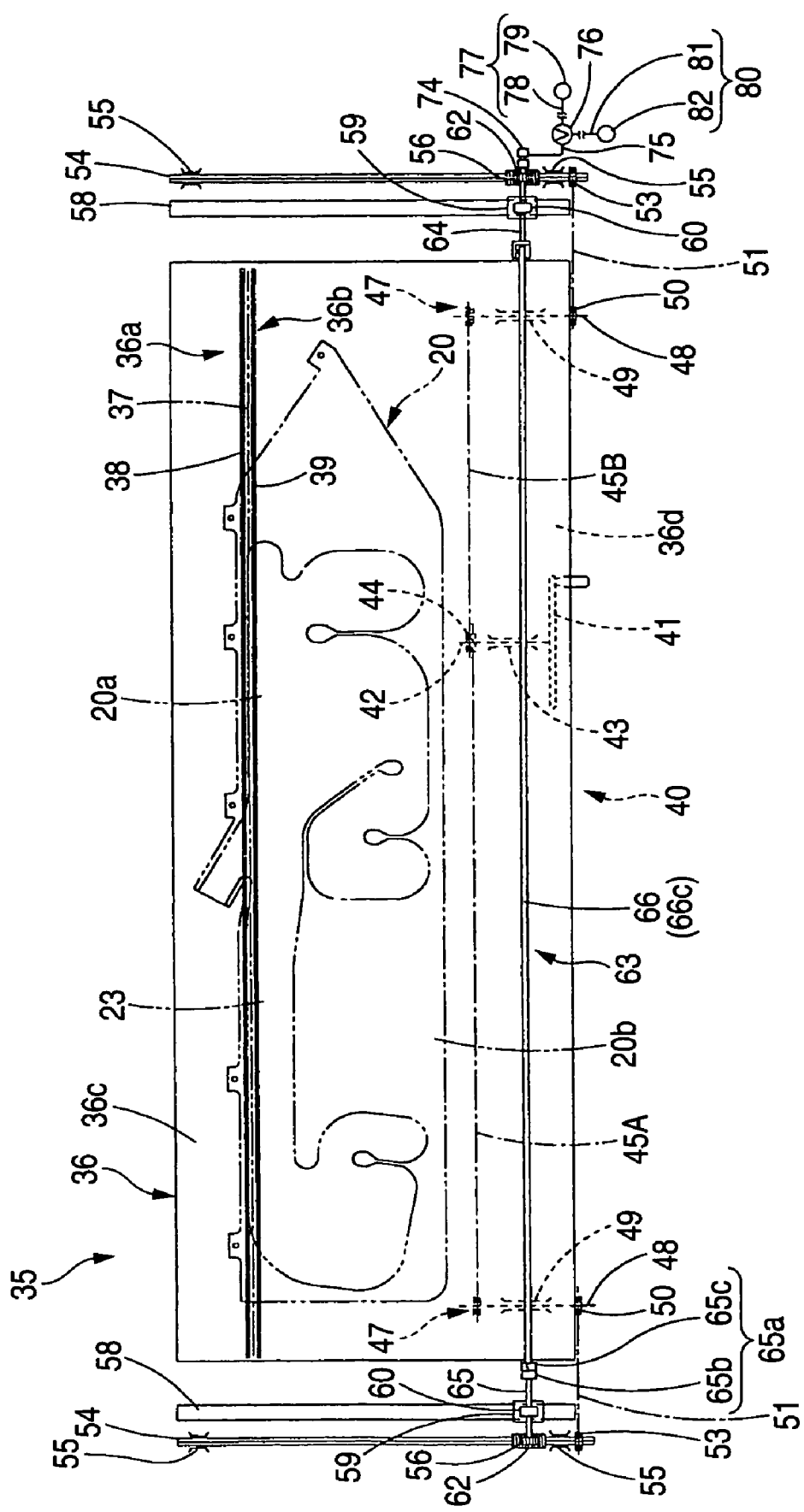
FIG. 5 is a schematic plan view of a folding device according to the embodiment.

In addition, a folding device 35 that is to be used for folding the airbag 20 is, as shown in FIG. 5, provided with a table 36 on which the airbag 20, which is spread flat, is placed, folding plates 37, 38, 39, a core member 63, a rotary mechanism 40 adapted to rotate the core member 63, an air suction source 77 for sucking in air from the core member 63 and an air discharge source 80 adapted to supply air to the side of the core member 63.

The table 36 includes legs, which are not shown, so as to be disposed at a position above a contact surface of a working area, as well as through holes 36a, 36b through which the folding plates 38, 39 are allowed to project from below.

The folding plate 37 is provided so as to move vertically and is provided above the table 36 so as to be pressed against a table upper surface 36c of the table 36 when lowered. This folding plate 37 is such as to be pressed against an upper side of the gas supply path portion 23 of the airbag 20 placed on the table upper surface 36c in order to produce a fold D1 on the airbag 20 and is made as a pressing folding plate 37.

The folding plates 38, 39 are provided so as to move vertically and are provided so as to project through the through holes 36a, 36b to above the table upper surface 36c. Then, the folding plate 38 is provided to produce the fold D0 on the airbag 20, and the folding plate 39 is provided to produce the fold D2 on the airbag 20.

The rotary mechanism 40 is such as to rotate the core member 63 by rotating manually a drive wheel 41 and is provided with a rotary drive shaft 42 mounted on the drive handle 41, sprockets 44, 47, 50, 53, chains 45A, 45B, driven shafts 48, 50, worm gears 56, worm wheels 62, guides 58, sliders 59, and bearings 43, 49, 55, 60.

The rotary drive shaft 42 at a rear end of which the drive wheel 41 is mounted is rotatably supported on the bearing 43 fixed to a lower surface 36d of the table 36. The sprocket 44 around which the chains 45A, 45B are wound is mounted at a front end of the rotary drive shaft 42.

The chains 45A, 45B extend to the left and right from the sprocket 44 to be wound, respectively, around the sprockets 47 on the driven shafts 48, 48 which are disposed near left and right ends of the table 36. The driven shafts 48, 48 are supported on the bearings 49 fixed to the table lower surface 36d, respectively, and the sprockets 50 around which chains 51 are wound are mounted, respectively, at rear ends of the driven shafts 48 which are far away from the sprockets 47.

Figure 10:
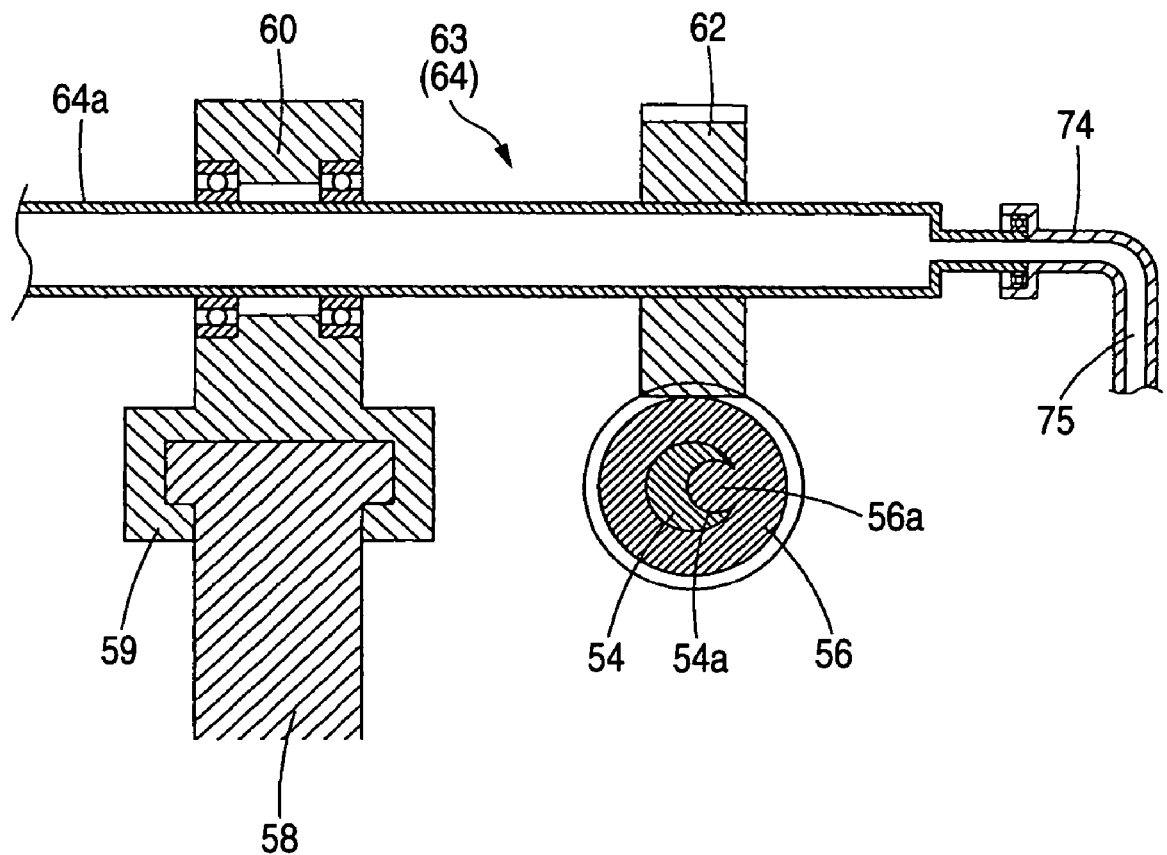
FIG. 10 is a partial longitudinally sectional view showing a vicinity of a worm gear at a right end side of the core member of the folding device according to the embodiment.

The chains 51, 51 are wound around the sprockets 53, respectively, and the sprockets 53 are mounted, respectively, at rear ends of the driven shafts 54, 54 which are disposed away from the left and right ends of the table 36, respectively, so as to extend along a transverse direction of the table 36. The driven shafts 54, 54 are made to each have a concave groove 54a which is provided along an axial direction thereof, as shown in FIG. 10 and are supported rotatably at both front and rear ends thereof by the bearings 55, 55, as shown in FIG. 5. In addition, the worm gears 56, which have convex protuberances 56a formed on inner circumferential surfaces thereof so as to fit in the concave grooves 54a, are fitted on the respective driven shafts 54, 54. Each worm gear 56 is fitted on the driven shaft 54 so as to move thereon along the axial direction of the driven shaft 54 and rotates together with the driven shaft 54 when rotated about the axis of the driven shaft 54.

Additionally, as shown in FIGS. 5, 10, the worm wheels 62, which are fixed to left and right end portions of the core member 63, are brought into mesh engagement with the worm gears 56, respectively.

The core member 63 is formed substantially into a round rod shape which can rotate integrally in a circumferential direction and is made to include a proximal end portion 64 which lies on a right end side thereof and to which a connecting port portion 74 communicating with an air passage 75 is connected, a distal end portion 65 which lies on a left end side thereof and a middle oscillatory portion 66. The worm wheels 62 are fixed to the proximal end portion 64 and the distal end portion 65, respectively, and the proximal end portion 64 and the distal end portion 65 are rotatably supported on the bearings of the sliders 59.

Note that each slider 59 is provided with an LM guide and is provided so as to move longitudinally along the guide 58.

Figure 6:
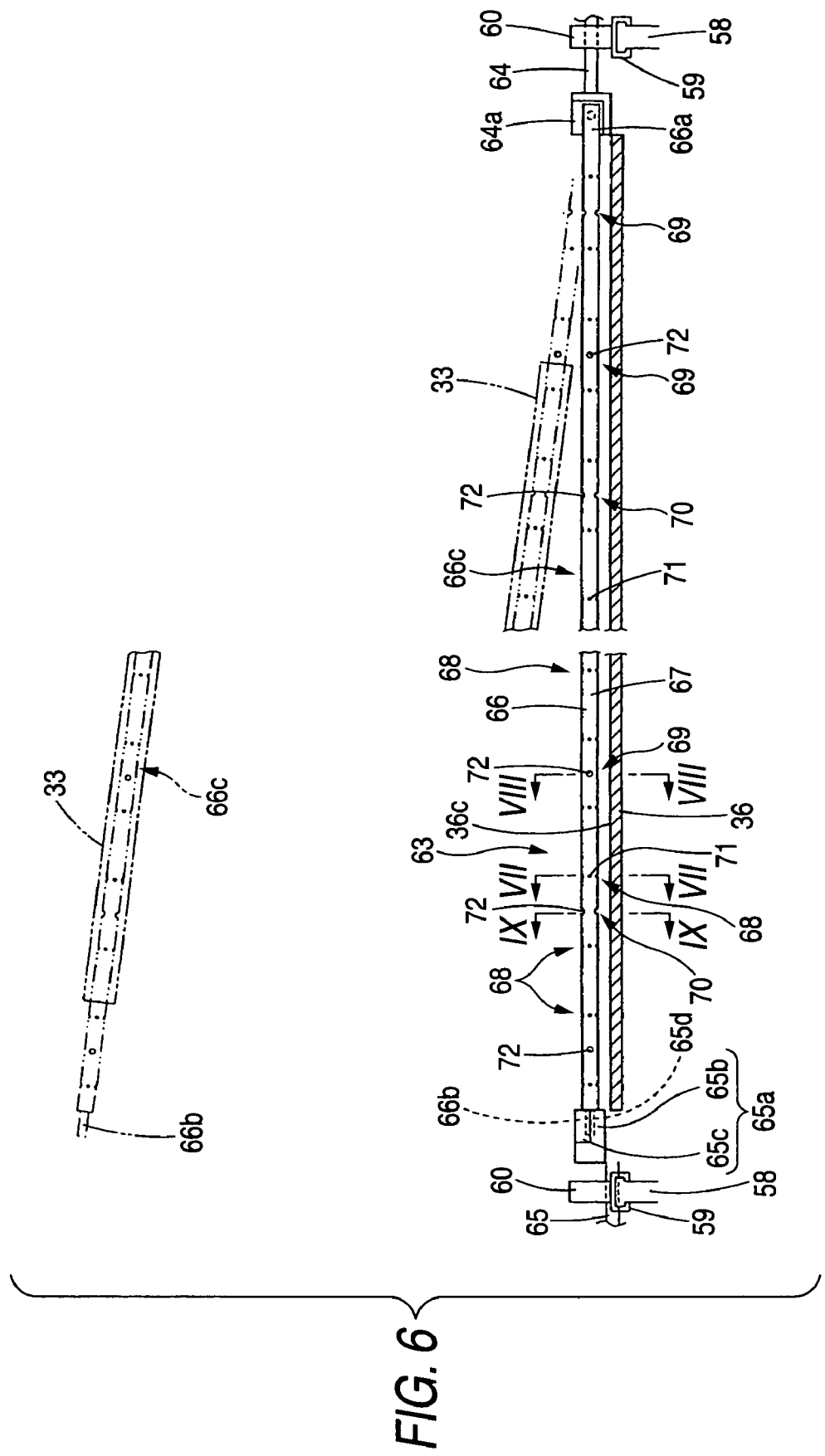
FIG. 6 is a schematic front view showing a vicinity of a core member of the folding device according to the embodiment.
Figure 7:
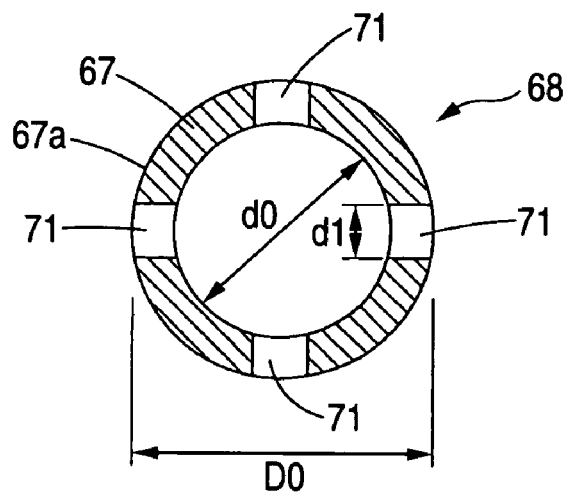
FIG. 7 is a sectional view of the core member used in the embodiment, which corresponds to a sectional view of a location taken along the line VII-VII in FIG. 6.
Figure 8:
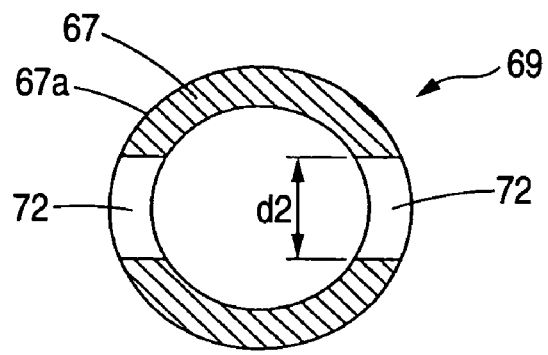
FIG. 8 is a sectional view of the core member used in the embodiment, which corresponds to a sectional view of a location taken along the line VIII-VIII in FIG. 6.
Figure 9:
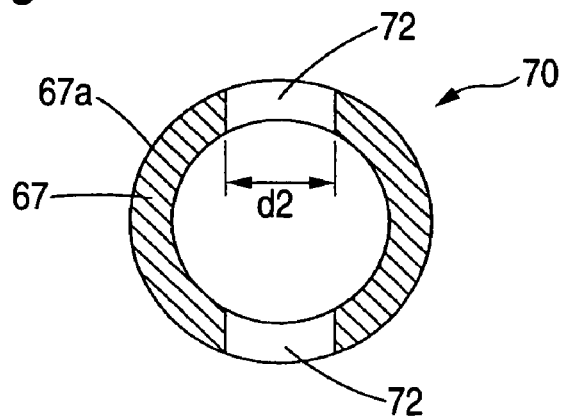
FIG. 9 is a sectional view of the core member used in the embodiment, which corresponds to a sectional view of a location taken along the line IX-IX in FIG. 6.

In addition, a support portion 64a, which supports the oscillatory portion 66 so as to allow oscillation thereof, is provided at an end portion of the distal end portion 64 which faces the oscillatory portion 66, and the support portion 64a holds a proximal end portion 66a of the oscillatory portion 66 so as to allow a distal end portion 66b of the oscillatory portion 66 to oscillate upwardly as shown by chain double-dashed lines in FIG. 6. Then, a connecting port portion 74 side of the proximal end portion 64 is connected rotatably relative to a support portion 64a side thereof. Due to this, on the proximal end portion 64 side of the core member 63, when the worm wheel 62 which is fixed thereto is driven to rotate, the connecting port portion 74 side does not rotate but the support portion 64a side rotates, whereupon the proximal end portion 66a of the oscillatory portion 66 which is held by the support portion 64a is driven to rotate smoothly together with the support portion 64a.

Furthermore, the air suction force 77 which can suck in air and the air discharge source 80 which can discharge air are, as shown in FIG. 5, connected to the air passage 75 which is connected to the connecting port portion 74 via a selector valve 76 which is interposed therebetween. The air suction source 77 is provided with a blower 79 and an air passage 78 which connects the blower 79 and the selector valve 76 together. The air discharge source 80 is provided with a compressor 82 and an air passage 81 which connects the compressor 82 and the selector valve 76 together. Then, the oscillatory portion 66 is held by the support portion 64a such that when the air suction source 77 is actuated, air within the oscillatory portion 66 can be sucked in via the support portion 64a, whereas when the air discharge source 80 is actuated, air can be supplied to the oscillatory portion 66 via the support portion 64a.

Additionally, as shown in FIGS. 5, 6, a connecting portion 65a having a cap 65c is provided at an end portion of the distal end portion 65 which faces the oscillatory portion 66. This connecting portion 65a is provided with a main body 65b and a cap 65c which is detachably mounted on the main body 65b. Additionally, the distal end portion 66b of the oscillatory portion 66 is formed into a quadrangular prism shape, and a concave groove 65d is formed in the connecting portion 65a in which the cap 65c is fitted so that the distal end portion 66b can be fitted thereinto. Due to this, in the event that distal end portion 65 side of the core member 63 rotates as the worm wheel 62 is driven to rotate after the distal end portion 66b has been fitted in the concave groove 65d and the cap 65c has been mounted on the main body 65b, the distal end portion 66b of the worm wheel 62 is driven to rotate smoothly by virtue of the fitting of the distal end portion 65b into the concave groove 65d.

The oscillatory portion 66 is, as shown in FIG. 6, configured such that a main body portion 66c between a proximal end portion 66a and the distal end portion 66b includes a cylindrical circumferential wall portion 67, and large and small circularly opened air suction holes 71, 72 are formed on the circumferential wall portion 67. Note that a communicating state with the proximal end portion 64 side of the core member 63 at the oscillatory portion 66 is established only as far as the distal end portion 66b side of the circumferential wall portion 67 since the distal end portion 66b of which an outside diameter is made smaller than the circumferential wall portion 67 and which is formed into the quadrangular prism shape is solid and hence clogged.

Additionally, as shown in FIGS. 6 to 9, there are provided suction areas 68 where four small-diameter air suction holes 71 are provided radially in a circumferential direction and suction areas 69, 70 where two large-diameter air suction holes 72 are provided at circumferentially symmetrical locations. The suction areas 69 and the suction areas 70 are disposed such that the directions in which the circumferentially disposed air suction holes 72, 72 are disposed intersect with each other at right angles. In addition, in the case of this embodiment, an outside diameter D0 of the circumferential wall portion 67 is 11 mm, an inside diameter d0 thereof is 8 mm, an inside diameter d1 of the through hole 71 is 2 mm and an inside diameter d2 of the through hole 72 is 4 mm. Furthermore, a pitch between the suction areas 69 is 50 mm and a pitch between the suction areas 69, 70 is 100 mm. Incidentally, the reason the suction areas 69, 70 including the large-diameter air suction holes 72 are provided is that there may exist a case where the airbag 20 is not sufficiently drawn to be secured to the core member 63 only with the suction areas 68 including the small-diameter air suction holes 71, and on the contrary, only with the suction area 69, 70 which include the large-diameter air suction holes 72, the rigidity of the circumferential wall portion 67 cannot be secured.

Figure 11A:
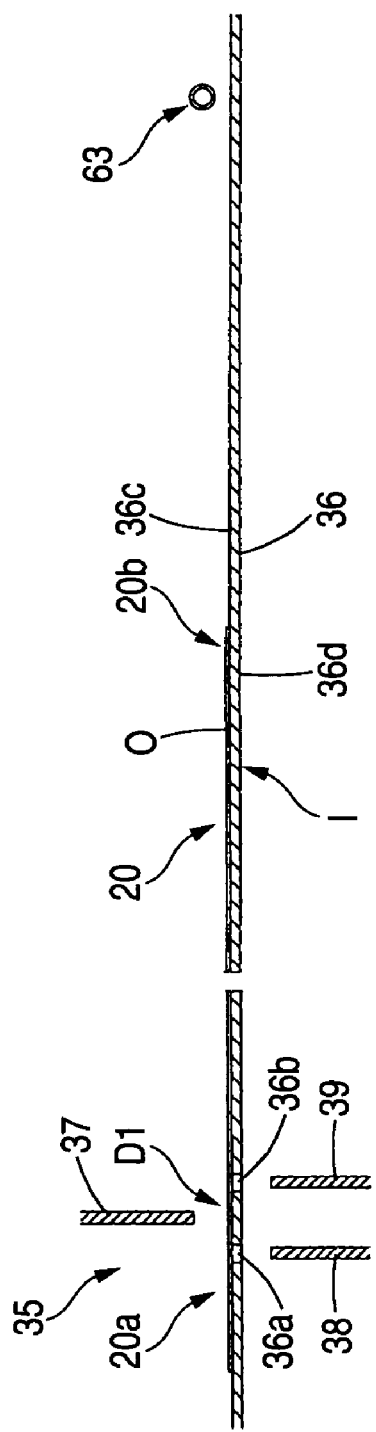
FIGS. 11A through 11C are explanatory views which explain sequentially a folding method of the embodiment.

Next, a process of folding the airbag 20 using the folding device 35 of the embodiment will be described below. First, as shown at FIG. 11A, the airbag 20 is spread flat and is placed on the upper surface 36c of the table 36. Note that, as this occurs, the airbag 20 is disposed such that a surface of the airbag 20 which will face the passenger compartment side I is brought into contact with the upper surface 36c, or such that a surface of the airbag 20 which will face the outside O of the vehicle is oriented upwards, and the airbag 20 is disposed on a locus along which the main body portion 66c of the oscillatory portion 66 of the core member 63 moves forwards, and furthermore, a position of the airbag 20 which corresponds to the fold D1 of the bellows part 31 is disposed directly below the folding plate 37.

Figure 11B:
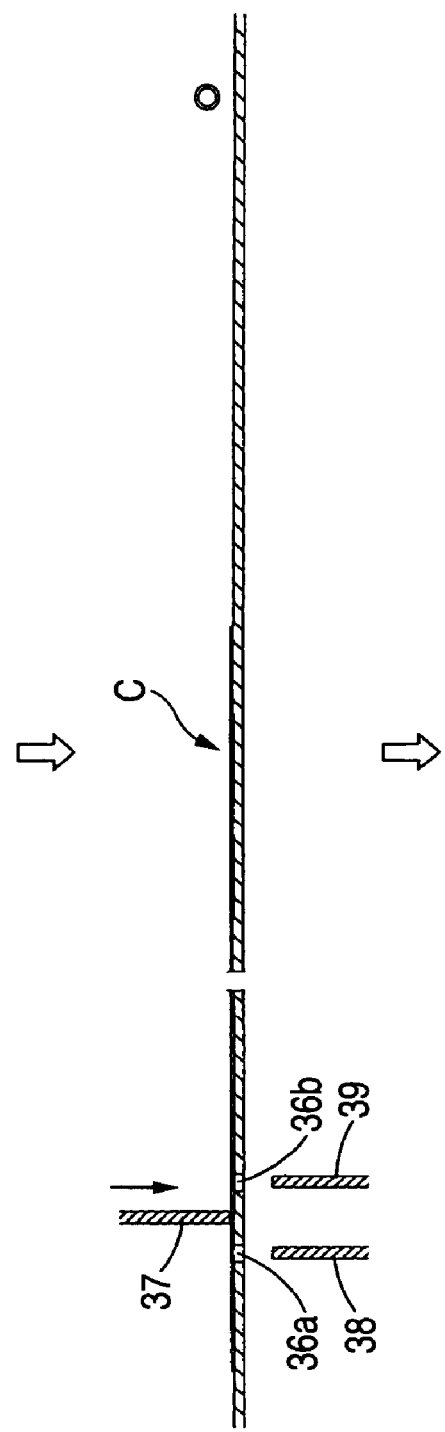
Figure 11C:
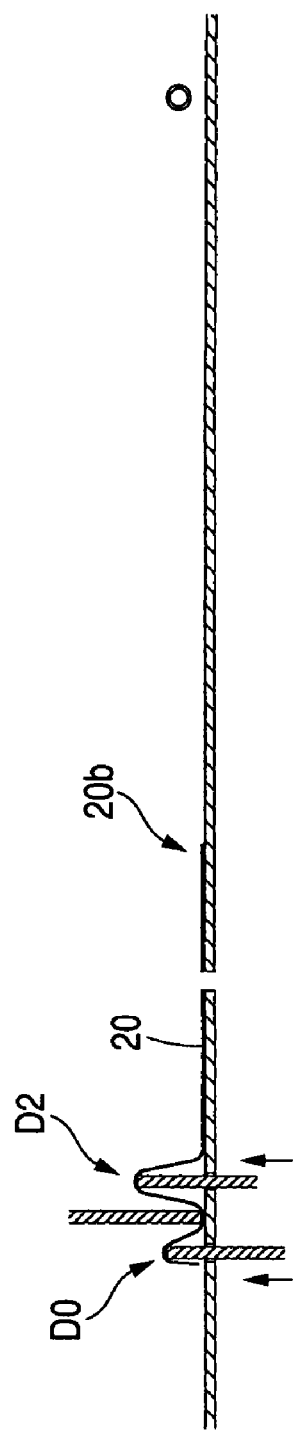

Thereafter, as shown in FIGS. 11B and 11C, the folding plate 37 is caused to descend to be pressed against the position of the airbag 20 which corresponds to the fold D1, while the folding plates 38, 39 are caused to ascend until they protrude through the through holes 36a, 36b to be above the table upper surface 36c by predetermined distances.

Then, as shown in FIG. 12A, the main body portion 66c (the circumferential wall portion 67) of the oscillatory portion 66 of the core member 63 is disposed on an area within the airbag 20 which passes upwardly near the lower edge 20b of the airbag 20, and the lower edge 20b side of the airbag 20 is lifted, so that the airbag 20 is placed around an outer circumference of the main body portion 66c of the oscillatory portion 66 of the core member 63 by a length which corresponds to on the order of a wind of airbag around the circumferential wall portion 67. Note that the position where the main body portion 66c is disposed on the airbag 20 is a position which corresponds to the center C of windings of a rolled-up shape 32 which is to be so formed at the end of the process.

In addition, when disposing the core member 63 at the predetermined position near the lower edge 20b, the left and right sliders 59 are caused to slide over the guides 58 to thereby move the core member 63, while the left and right worm gears 56 are moved along the driven shafts 54 in such a state that the mesh engagement state between the respective worm gears 56 with the worm wheels 62 is maintained.

Incidentally, as this occurs, since in the event that the wheel 41 mounted on the rotary drive shaft 42 is operated to rotate in a predetermined direction (for example, a clockwise direction), the respective worm gears 56 are allowed to move relative to the driven shafts 54 along the same shafts 54, even in case the driven shafts 54 rotate, the respective worm gears 56 and the worm wheels 62 which mesh with the worm gears 56 become difficult to be moved along the driven shafts 54 over a predetermined distance, and hence, the core member 63 becomes difficult to be disposed at the predetermined position. Thus, as has been described above, it is desirable to move directly the core member 63.

Figure 14A:
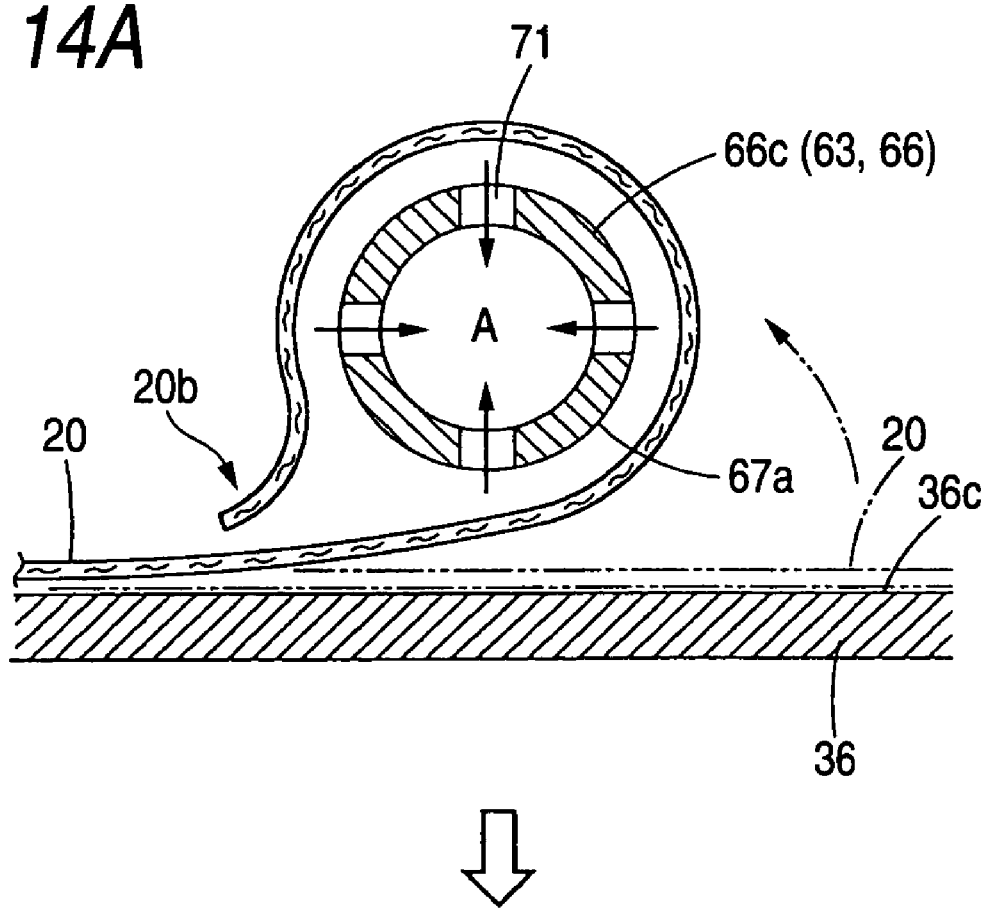
FIGS. 14A and 14B are views showing processes in which the airbag is drawn to be secured to the core member in the folding process of the embodiment.
Figure 14B:
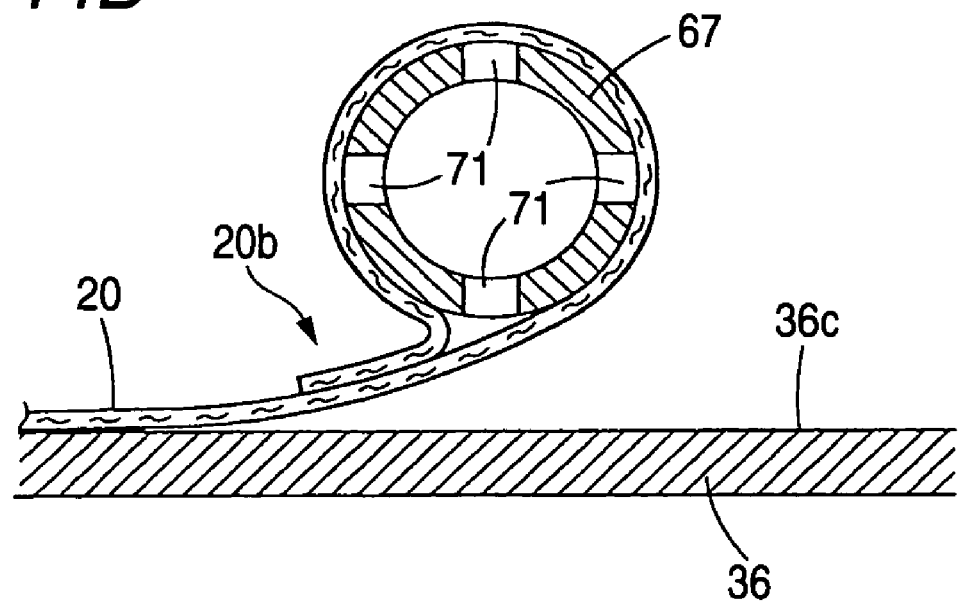

Then, after the portion of the airbag 20 which lies near the lower edge 20b thereof is placed around the circumferential wall portion 67, the selector valve 76 is operated so as to cause the air passages 75, 78 to communicate with each other and the blower 79 of the air suction source 77 is actuated. Then, as shown in FIGS. 14A and 14B, since air A is sucked into the interior of the circumferential wall portion 67 from the respective air suction holes 71, 72, the portion of the airbag 20 near the lower edge 20b thereof is drawn to be secured to the circumferential wall portion 67 of the core member 63.

Thereafter, the wheel 41 mounted on the rotary drive shaft 42 is operated to rotate in the predetermined direction (for example, in the clockwise direction). Then, the rotary drive shaft 42 rotates, whereby the respective left and right driven shafts 48, 48 are caused to rotate by the chains 45A, 45B which are wound around the sprocket 44 of the drive shaft 42 and the sprockets 47 of the driven shafts 48, accompanied by the rotation of the drive shaft 42. Furthermore, accompanied by the rotation of the respective driven shafts 48, 48, the respective left and right driven shafts 54, 54 are caused to rotate by the chains 51 which are wound around the sprockets 50 of the driven shafts 48 and the sprockets 53 of the driven shafts 54, 54. Then, accompanied by the rotation of the respective driven shafts 54, 54, the worm gears 56 rotate, whereby the core member 63 is caused to rotate together with the worm wheels 62.

As this occurs, since the lower edge 20b of the airbag 20 is drawn to be secured to the outer circumferential surface of the circumferential wall 67 of the core member 63 and the airbag 20 is fastened to the table upper surface 36c by means of the folding plate 37 on the side of the upper edge 20a of the airbag 20, when the core member 63 rotates, the core member 63 is allowed to advance while winding up the airbag 20 therearound with the respective left and right sliders 59, 59 allowed to slide on the guides 58. Of course, as this occurs, even in the event that the core member 63 moves forwards while rotating, the respective left and right worm wheels 62, which are fixed, respectively, to the proximal end portion 64 and the distal end portion 65 of the core member 63, moves the respective worm gears 56 forwards along the driven shafts 54 while maintaining the state in which the worm wheels 62 are in mesh engagement with the worm gears 56, respectively, and as a result, the core member 63 can continue to move forwards while rotating, only in case the drive wheel 41 continues to be operated to rotate, by making use of the rotary mechanism 40 which is provided with the shafts 42, 48, 54, the sprockets 44, 47, 50, 53, the chains 45A, 45B, 51, worm gears 56, worm wheels 62, the guides 58 and the sliders 59.

Figure 13A:
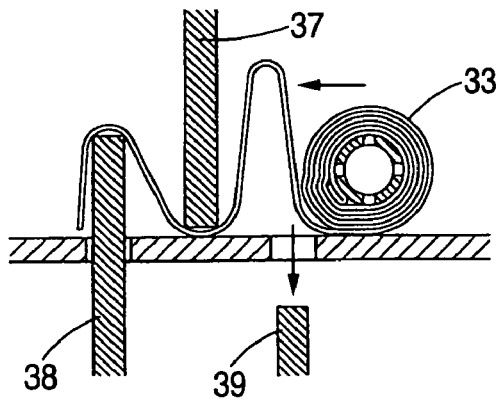
FIGS. 13A through 13D are explanatory views which explain sequentially processes of the folding method of the embodiment which follow the processes shown in FIGS. 12A and 12B.
Figure 13B:
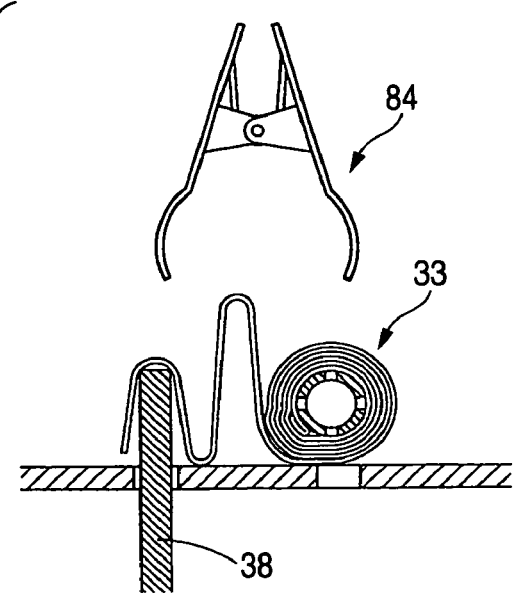

In addition, when the core member 63 continues to move forwards while winding up the airbag 20 therearound by continuing to operate the drive wheel 41 to rotate, whereby a spiral shape 33 of the airbag 20 approaches near the folding plate 39 as shown in FIG. 12B, the folding plate 39 is, as shown in FIG. 13B, lowered as down as an initial position resulting before its movement, so that the spiral shape 33 of the airbag 20 is moved as far as near a position where the spiral shape 33 is brought into abutment with the pressing folding plate 37. Furthermore, as shown in FIG. 13B, the pressing folding plate 37 is raised to its initial position, so that the spiral shape 33 of the airbag 20 is moved as far as near a position where the spiral shape 33 of the airbag 20 is brought into abutment with the folding plate 38. Then, the oscillatory portion 66 of the core member 63 is rotated to an oscillatory position of the proximal end portion 66a so that the distal end portion 66b side thereof can be oscillated upwardly about the location thereof where the oscillatory portion 66 is supported by the support portion 64a of the distal end portion 66a side as the rotary center, and following this, the rotary operation of the wheel 41 is stopped so as to stop the rotation of the core member 63.

Figure 13C:
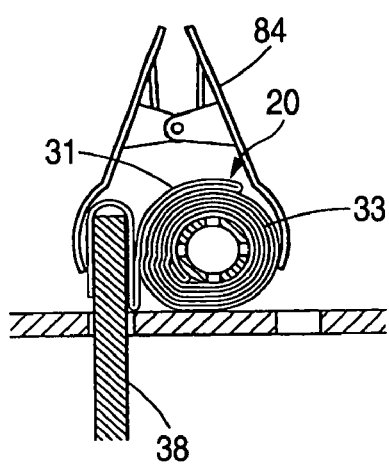
Figure 13D:
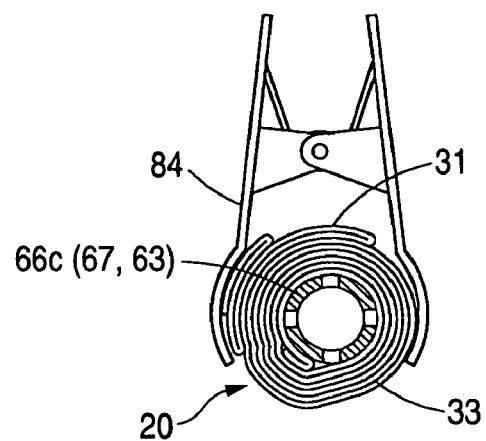

Thereafter, as shown in FIG. 13C, the bellows part 31 and the spiral shape 33 of the airbag are gripped together with the folding plate 39 and the core member 63 by making use of a plurality of clips 84. Following this, the cap 65c is removed from the main body 65b, and the distal end portion 66b side of the oscillatory portion 66 is oscillated about the proximal end portion 66a side as the rotary center, as shown in FIG. 13D and by chain double-dashed lines in FIG. 6, so that the distal end portion 66b side of the oscillatory portion can be oscillated upwardly, and then, the airbag 20 is removed of the oscillatory portion 66.

Figure 15A:
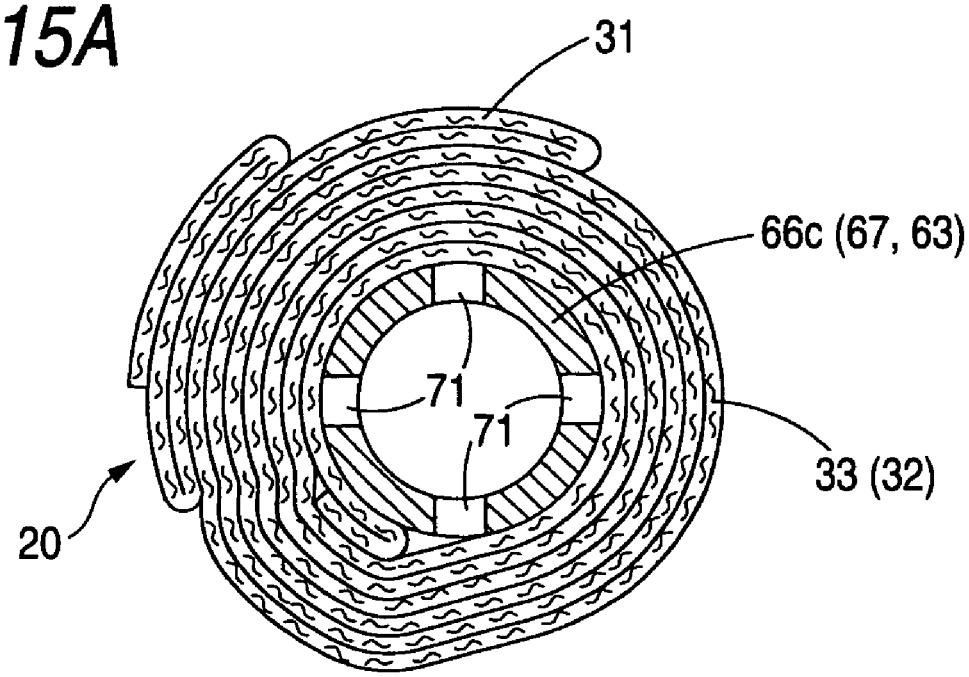
FIGS. 15A and 15B are views showing a state in which air is discharged from the core member in the folding process of the embodiment.
Figure 15B:
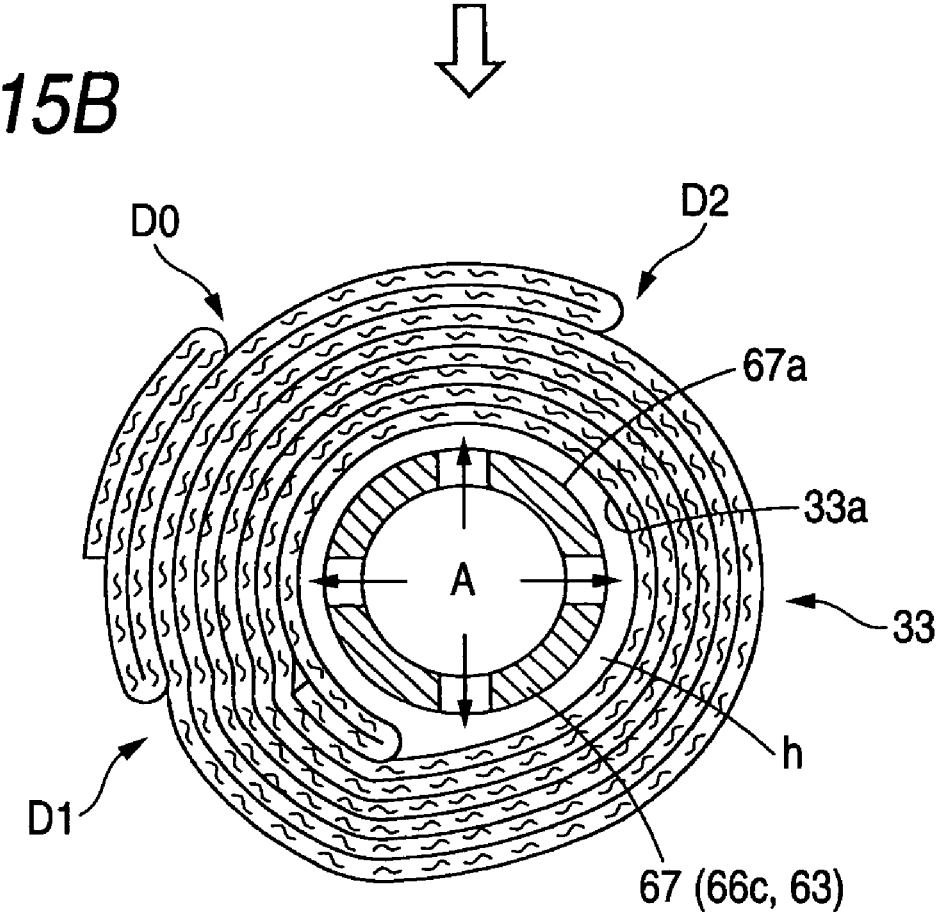

As this occurs, the air passages 75, 81 are caused to communicate with each other by stopping the operation of the air suction source 77 and operating the selector valve 76, and the compressor 82 of the air discharge source 80 is actuated. Then, as shown in FIGS. 15A and 15B, since air A is discharged from the respective air suction holes 71, 72 of the oscillatory portion 66, a gap h can be generated between an inner circumferential surface 33a of the spiral shape 33 and the outer circumferential surface 67a of the circumferential wall portion 67, whereby the airbag 20 can easily be removed of the core member 63.

Thereafter, a predetermined location on the airbag 20 is wrapped around by a folds collapsing preventing wrapping material which is breakable and is not shown, while the clips 84 are removed, and furthermore, the inflator 12, on which the mounting bracket 13 has already been mounted, is connected to the connecting port portion 22 of the airbag 20 by making use of the clamp 15. In addition, the mounting brackets 10 are mounted on the respective mounting portions 28. Furthermore, the guide bracket 17 is mounted on the airbag 20, whereby an airbag assembly is eventually formed.

Thereafter, the respective brackets 10, 13, 17 are disposed at the predetermined positions on the inner panel 2 on the side of the body 1, and the bolts 11, 14 are passed through the respective mounting holes 28a so as to fix the respective brackets 10, 13, 17 to the inner panel 2 with the bolts 11, 14, the airbag assembly being thereby mounted on the body 1. Following this, a lead wire, not shown, which extends from a predetermined control unit for controlling the actuation of the inflator, is connected to the inflator 12, and the front pillar garnish 4 and the roof lining 5 are mounted on the body 1. Furthermore, the rear pillar garnish 6 and the center pillar garnish 7 are mounted on the body 1, whereby the airbag apparatus M can be installed on the vehicle V.

When the inflator 12 is actuated after the airbag apparatus M has been installed on to the vehicle V, the inflation gas G from the inflator 12 is, as indicated by chain double-dashed lines in FIG. 2, allowed to flow from the connecting port portion 22 into the gas supply path portion (the upstream-side part) 23 and then flows in both longitudinal directions along the gas supply path portion 23, continuing to flow into the primary protecting inflating portion 24 of the airbag 20, whereby the front and rear portions 24a, 24b of the primary protecting inflating portion 24 start to inflate while unfolding the folds. Then, the airbag 20 breaks the wrapping material, not shown, which wraps the airbag 20, push opens the airbag cover 8 on the lower edge side of the front pillar garnish 4 and the roof lining 5 and is allowed to deploy and inflate, while projecting downwards, so largely as to cover the passenger compartment side I of the side windows W1, W2, the center pillar portion CP, and the rear pillar portion RP, as indicated by a chain double-dashed line in FIG. 1.

In addition, in the folding method and folding device 35 of the airbag 20 of the embodiment, the circumferential wall portion 67 of the core member 63, to which the airbag 20 is drawn to be secured by sucking in air A, is disposed at the position of the airbag 20 which corresponds to the center C of a spiral winding of airbag 20 when formed, and following this, the core member 63 is rotated so as to form on the airbag 20 a rolled-up shape 32 where the airbag 20 is wound into a spiral. In addition, since the airbag itself has such an extent of impermeability that air is not allowed to pass therethrough, so as to be inflated when the inflation gas G is introduced thereinto, the airbag 20 can be wound around the circumferential wall portion 67 of the core member 63 smoothly without being dislocated therefrom, whereby the rolled-up shape 32 can appropriately formed on the airbag 20.

In particular, in the folding method and folding device 35 of the embodiment, since the airbag 20 is wound around the outer circumferential surface 67a of the circumferential wall portion 67 (the main body portion 66c) of the single core member 63 to form the rolled-up shape 32 of airbag 20, a hollow space produced at the center C of the rolled-up shape 32 of the airbag 20 is of a size which coincides substantially with an outside diameter of the core member 63, and hence, an inside diameter dimension of the hollow space at the center of the rolled-up shape 32 can be made as small as possible compared with the conventional folding method in which the two folding rods are disposed at the center of the rolled-up shape, or the area (the area of the primary protecting inflating portion 24 in the embodiment) of the airbag 20 where the airbag 20 is rolled up in the spiral manner can be made as large as possible, thereby making it possible to easily secure a stable and compact spirally folded shape of primary protecting inflating portion 24 when the designed folding is completed.

In addition, in the folding method and folding device 35 of the embodiment, when attempting to relatively remove the core member 63 from the folded airbag 20, air A is made to be discharged from the air suction holes 71, 72, the gap h can easily be generated between the inner circumferential surface 33a of the spiral shape 33 where the airbag 20 is wound up in the spiral manner and the outer circumferential surface 67a of the core member 63, and therefore, even when the airbag 20 is strongly wound around the core member 63 with a view to attaining a further compact folding, the core member 63 can smoothly be removed of the airbag 20 so wound up.

Consequently, in the airbag folding method and folding device 35 of the airbag 20 of the embodiment, the rolled-up shape 32 can appropriately be formed, and the airbag 20 can easily be folded up compact.

Note that while in the embodiment, air A is made to be discharged from the respective air suction holes 71, 72 so as to relatively pull the core member 63 out of the airbag 20, the core member 63 may be removed of the airbag 20 only by stopping the suction of air when attempting to pulled the core member 63 out of the airbag. Also in this case, in the event that the suction of air A is stopped, a gap is easily generated between the inner circumferential surface 33a of the spiral shape 33 where the airbag 20 is wound up into the spiral and the outer circumferential surface 67a of the core member 63, thereby making it possible to pull the core member 63 out of the airbag 20 in the smooth fashion.

Furthermore, in the embodiment, the bellows part 31 of the airbag 20 is also formed by making use of the plurality of folding plates 37, 38, 39, and the folding work of the airbag 20 of the embodiment can be completed using the single folding device 35.

In addition, the folding device 35 of the embodiment is such that the upper edge 20a side, which is part of the airbag 20, is pressed against and fastened to the table upper surface 36c by the folding plate 37, and the core member 63 itself is caused to approach the upper edge 20a side while the airbag 20 is allowed to be wound up around the rotating core member 63, so as to form the rolled-up shape 32 on the primary protecting inflating portion 24 of the airbag 20. Namely, the worm gears 56 fitted on the driven shafts 54 are provided so as to move relative to the driven shafts 54 along the same shafts 54 while maintaining the mesh engagement state with the worm wheels 62 fixed to the core member 63, and in the event that the lower edge 20b, which is part of the airbag 20, is drawn to be secured to the circumferential wall portion 67 of the core member 63, the core member 63, which is being driven to rotate, can automatically wind up the airbag 20 therearound while approaching the upper edge 20a side of the airbag 20, whereby the airbag 20 can be rolled up in a simple fashion with no looseness or the like caused, without separately controlling the rotary angle of the core member 63 and the advancing distance of the core member 63.

Of course, in case nothing described above is taken into consideration, part of the airbag may be drawn to be secured to the core member and the core member may be rotated without pressing against and moving the airbag in the longitudinal direction of the driven shafts, so that the core member is allowed to wind up the airbag therearound so as to form a rolled-up shape on the airbag.

Furthermore, in the folding device 35 of the embodiment, the rolling-up work of the airbag 20 is implemented by manually operating the drive wheel 41 to rotate, whereby the airbag 20 can be folded up as economically as possible and in the simple construction.

Note that while in the embodiment, the airbag for use in the head protecting airbag apparatus M is described as the airbag to be folded up, the invention can be applied to various types of airbags which are folded up so as to provide a rolled-up shape thereon so as to be used for other airbag apparatuses such as driver's seat airbag apparatus, front passenger's seat airbag apparatus, side airbag apparatus, knee protecting airbag apparatus, and pedestrian protecting airbag apparatus.

What is claimed is:

1. A method of folding an airbag, comprising the steps of:
   disposing a core member having an air suction hole thereon on a part of a spread airbag to be rolled up corresponding to a center of a rolled-up shape of the airbag;
   rotating the core member while sucking air from the air suction hole of the core member so that the airbag is sucked on an outer circumferential surface of the core member and wound around the core member; and
   removing the core member to thereby leave the airbag in the rolled-up shape, wherein air is discharged from the air suction hole when the core member is removed.

* * * * *